Patented Nov. 11, 1941

2,262,743

UNITED STATES PATENT OFFICE 2,262,743

PROCESS FOR BREAKING PETROLEUM EMULSIONS

Melvin De Groote, University City, and Bernhard Keiser and Charles M. Blair, Jr., Webster Groves, Mo., assignors to Petrolite Corporation, Ltd., Wilmington, Del., a corporation of Delaware No Drawing. Application May 12, 1941, Serial No. 393,128

4 Claims. (Cl. 252—344)

This invention relates primarily to the resolution of petroleum emulsions, our present application being a continuation, in part, of our co-pending application Serial No. 342,716, filed June 27, 1940.

One object of our invention is to provide a novel process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

Incidentally, a compound of the kind herein contemplated may be used as a break-inducer and for doctor treatment of the kind intended to sweeten gasoline. See U. S. Patent No. 2,157,223, dated May 9, 1939, to Sutton.

Such compounds may also find utility in recovering oil from subterranean oil-bearing strata. See U. S. Patent No. 2,223,381, dated February 25, 1941, to De Groote and Keiser.

Compounds of the type herein contemplated are of particular value in preventing water-in-oil emulsions resulting from acidization of calcareous oil-bearing strata. See U. S. Patent No. 2,233,383, dated February 25, 1941, to De Groote and Keiser. Such specific application of demulsifiers of the kind herein contemplated is disclosed in our co-pending application Serial No. 393,129, filed May 12, 1941.

The chemical compounds herein contemplated as demulsifying agents, are oxyalkyl derivatives of imidazolines. These types of materials and the method of preparing the same are well known. For instance, see U. S. Patent No. 2,211,001, dated August 13, 1940, to Chwala.

In our aforementioned co-pending application Serial No. 342,716, which is concerned with various chemical compounds adapted for use in breaking oil field emulsions, reference was made to a type exemplified by the following formula:

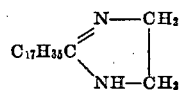

In regard to such compounds, it is pointed out in said co-pending application Serial No. 342,716, that the oxyalkylated derivatives may be employed. This fact is stated in the following language:

"Also, as is well known, any of the diamines of the kind previously described containing at least one amino hydrogen atom may be converted into hydroxylated derivatives by reaction with an alkylene oxide, such as ethylene oxide, propylene oxide, glycidol, epichlorhydrin, and the like. As to the general procedure employed, although not concerned particularly with cyclic amines or the like, reference is made to U. S. Patent No. 2,046,720, dated July 7, 1936, to Bottoms."

The compounds herein contemplated are characterized by the presence of a five-membered heterocyclic ring with two atoms different from carbon. More specifically, they may be considered as derivatives of imidazole, frequently referred to as glyoxaline. Imidazole (glyoxaline) is indicated by the following formula:

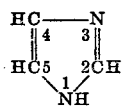

The imidazolines or glyoxalidines may be considered as dihydro-derivatives of amidazole (glyoxaline); and thus the expressions "dihydroglyoxalines" and "glyoxalidines" are often employed. The introduction of two hydrogen atoms at the 4—5 position results in the conversion of imidazole into dihydroglyoxaline, which may be indicated by the following formula:

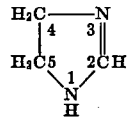

As to the manufacture of imidazolines, reference is made to the following patents: U. S. Patents Nos. 2,215,861, 2,215,862, 2,215,863 and 2,215,864, dated September 24, 1940, to Waldmann and Chwala.

Imidazolines or glyoxalidines may be regarded as dehydration products of certain amides; and they may be obtained by reacting polyamines and the higher carboxylic acids under certain conditions. The formation of these glyoxalidine compounds, while forming no part of the present invention, is indicated by the following scheme:

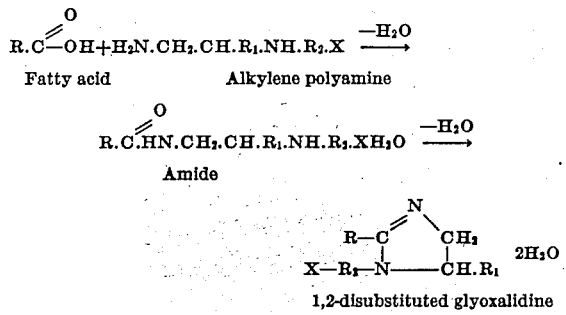

wherein R represents an alkyl or alkenyl group containing from 10 to 20 carbon atoms (the residue of a higher fatty acid); $R_1$ represents hydrogen or a lower alkyl group; $R_2$ represents an alkylene group or a lower alkyl substituted alkylene group; and X represents a hydroxyl group, an amino group, or an aminoalkylene substituted imino group. See U. S. Patent No. 2,214,152, dated September 10, 1940, to Wilkes.

See also U. S. Patents Nos. 2,155,877 and 2,155,878, both dated April 25, 1939, to Waldmann and Chwala.

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term previously indicated.

Among sources of such acids may be mentioned straight chain and branched chain, saturated and unsaturated, carboxylic, aliphatic, alicyclic, fatty, aromatic, hydroarmoatic, and aralkyl acids including caprylic acid, butyric acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, triricinoleic acid, polyricinoleic acid, ricinostearolic acid, ricinoleyl lactic acid, acetylricinoleic acid, chloracetyl-ricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as these mentioned; hydroxy and alpha-hydroxy higher carboxylic, aliphatic and fatty acids, such as hydroxystearic acid, dihydroxypalmitic acid, dihydroxystearic acid, dihydroxybehenic acid, alphahydroxy capric acid, alphahydroxy stearic acid, alphahydroxy palmitic acid, alphahydroxy lauric acid, alphahydroxy myristic acid, alphahydroxy cocoanut oil mixed fatty acids, alphahydroxy margaric acid, alphahydroxy arachidic acid, and the like; fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids derived, by oxidation and other methods, from paraffin wax, petroleum and similar hydrocarbons; resinic and hydroaromatic acids, such as hexahydrobenzoic acid, hydrogenated naphthoic, hydrogenated carboxy-diphenyl, naphthenic, and abietic acid; aralkyl and aromatic acids, such as hexahydrobenzoic acid, hydrogenated naphthoic, hydrogenated poly carboxy-diphenyl, naphthenic, and abietic acid; aralkyl and aromatic acids, such as benzoic acid, Twitchell fatty acids, naphthoic acid, carboxy-diphenyl, pyridine carboxylic acid, hydroxybenzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

As is well known, one may use substituted acids in which some other non-functional constituent enters the structure of the fatty acid. For instance, one may use aryl-, hydroxy-, alkoxy-, chlor-, keto-, and amino-derivatives. Generally speaking, however, it is always preferable to use the unsubstituted acid, particularly free from substituents which contain either oxygen or nitrogen atoms. Generally speaking, the introduction of hydrocarbon radicals, regardless of source, has little effect, except in altering the hydrophile-hydrophobe balance.

One may also employ the blown or oxidized acids, such as blown ricinoleic acid, blown oleic, etc., or estolides derived from blown oils, such as blown castor oil, blown soyabean oil, etc.

Needless to say, the acids themselves need not be employed; but one may readily employ any functional equivalent, such as the anhydride, the acyl chloride, or the like. In some instances, the esters, especially in presence of a trace or a significant amount of water, act as the acid itself, in that the acid is liberated. Unless specific reference is made to a particular isomer, one may employ any isomer or mixture of various isomers, if the acid or acids are so available. We have produced demulsifiers, for use in our process, by the following procedures:

Example 1

1-aminoethyl-2-heptadecenyl glyoxalidine is prepared by mixing one gram mole (282 grams) of oleic acid with two gram moles (206 grams) of diethylene triamine, and heating the mixture for a period of about 16 hours under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecenyl glyoxalidine was obtained as a pale yellow liquid. The product also may be designated by reference to the reactants used in its preparation, as oleyl diethylene triamine.

Ethylene oxide is introduced into the above base at a temperature of about 120-140° C., until the increase in weight amounts to about 2½ pound moles of ethylene oxide calculated upon one pound mole of the base.

Example 2

The base used in the preceding example is replaced by 1-(aminoethyl ethylamino)-2-heptadecenyl glyoxalidine. This glyoxalidine was prepared by reacting 1 gram mole of oleic acid with three gram moles (438 grams) of triethylene tetramine in a vessel equipped with a distilling column. The mixture was heated for a period of about six hours, and water was continuously removed until a temperature of about 300° C. was reached. Approximately 1.9 moles of water were thus removed. The reaction mixture was then distilled under vacuum to remove excess triethylene tetramine. Ethylene oxide was employed in the same manner as in Example 1, preceding.

Example 3

Tetraethylenepentamine is substituted for triethylene tetramine as a reactant in the preceding example. The glyoxalidine obtained was treated as before with ethylene oxide.

Example 4

Lauric acid is substituted as a reactant for oleic acid in the three preceding examples.

Example 5

Ricinoleic acid is substituted for oleic acid in Examples 1-3 preceding.

Example 6

Naphthenic acid is substituted for oleic acid in Examples 1-3 preceding.

Example 7

An equivalent molal amount of propylene oxide is substituted for ethylene oxide in Examples 1-6 preceding.

The preferred type of demulsifier is obtained by the action of 2-10 moles of the oxalkylating agent, for instance, ethylene oxide or propylene oxide, on one mole of the imidazoline.

In the hereto appended claims, the addition products formed by reaction with acids or the basic form by reaction with water, is included within the scope of the claim. Similarly, where the claims specify the presence of the group —N—(R—O)$_n$H; —NH—(R—O)$_n$H i. e., the group introduced by oxyalkylation at the amino hydrogen position, it is understood that R includes groups derived from glycid or the like.

It is to be noted that the compounds herein contemplated, being basic in character, may be used as such, or in the form of a base, i. e., in combination with water, or in the form of a salt, i. e., in combination with an organic or inorganic acid, such as hydrochloric acid, acetic acid, lactic acid, and the like.

Specific attention is directed to the fact that one may use various oxyalkylating agents in addition to those already indicated. For instance, note the oxyalkylating agents specifically enumerated in aforementioned U. S. Patent No. 2,211,001, and also in U. S. Patent No. 2,208,581, dated July 23, 1940, to Hoeffelmann. All the oxyalkylating agents mentioned in both of the previously designated patents may be employed as reactants for the manufacture of demulsifying agents contemplated in the present process.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, a treating agent or demulsifier of the kind above described is brought into contact with or caused to act upon the emulsion to be treated, in any of the various ways, or by any of the various apparatus now generally used to resolve or break petroleum emulsions with a chemical reagent, the above procedure being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

What we claim as new and desire to secure by Letters Patent is:

1. A process for breaking petroleum emulsions of the water-in-oil type, characterized by subjecting the emulsion to the action of a demulsifier comprising oxyalkylated imidazolines substituted in 2-position, by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical:

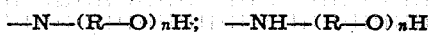

wherein R denotes an aliphatic radical and $n$ is a whole number greater than 2 and less than 11.

2. A process for breaking petroleum emulsions of the water-in-oil type, characterized by subjecting the emulsion to the action of a demulsifier comprising oxyalkylated imidazolines substituted in 2-position by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical:

wherein R denotes an aliphatic radical and $n$ is a whole number greater than 2 and less than 11; said radical substituted in the 2-position being derived from a higher fatty acid.

3. A process for breaking petroleum emulsions of the water-in-oil type, characterized by subjecting the emulsion to the action of a demulsifier comprising oxyalkylated imidazolines substituted in 2-position by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical:

wherein R denotes an aliphatic radical and $n$ is a whole number greater than 2 and less than 11; said radical substituted in the 2-position being derived from naphthenic acid.

4. A process for breaking petroleum emulsions of the water-in-oil type, characterized by subjecting the emulsion to the action of a demulsifier comprising oxyalkylated imidazolines substituted in 2-position by a radical containing from 11-22 carbon atoms selected from the group consisting of alicyclic hydrocarbon radicals, aliphatic hydrocarbon radicals, and aliphatic hydrocarbon radicals substituted by hydroxyl radicals; said oxyalkylated imidazolines containing the radical:

wherein R denotes an aliphatic radical and $n$ is a whole number greater than 2 and less than 11; said radical substituted in the 2-position being derived from abietic acid.

MELVIN DE GROOTE.
BERNHARD KEISER.
CHARLES M. BLAIR, Jr